United States Patent [19]

Haese

[11] 4,073,862
[45] Feb. 14, 1978

[54] PROCESS FOR REMOVING AMMONIA, HYDROGEN SULFIDE AND HYDROCYANIC ACID FROM GASES

[75] Inventor: Egon Haese, Bochum-Linden, Germany

[73] Assignee: Dr. C. Otto & Comp. G.m.b.H., Bochum, Germany

[21] Appl. No.: 695,380

[22] Filed: June 14, 1976

Related U.S. Application Data

[63] Continuation of Ser. No. 500,712, Aug. 26, 1974, abandoned.

[30] Foreign Application Priority Data

Aug. 24, 1973   Germany ............................ 2342757

[51] Int. Cl.$^2$ ...................... C01B 17/16; C01B 31/20
[52] U.S. Cl. .................................... 423/220; 423/234; 423/236; 423/238; 423/541 A
[58] Field of Search ............... 423/220, 224, 234, 236, 423/237, 238, 541 A

[56] References Cited

U.S. PATENT DOCUMENTS

| | | | |
|---|---|---|---|
| 2,008,253 | 7/1935 | Klempt | 423/236 |
| 3,540,189 | 11/1970 | Siewers et al. | 423/237 |
| 3,645,683 | 2/1972 | Isbell | 423/541 A |
| 3,661,507 | 5/1972 | Breitbach et al. | 423/236 |
| 3,761,575 | 9/1973 | Furkert | 423/541 A |
| 3,795,731 | 3/1974 | Furkert | 423/541 A |
| 3,819,816 | 6/1974 | Wunderlich et al. | 423/238 |
| 3,855,390 | 12/1974 | Matumoto et al. | 423/166 |
| 3,887,682 | 6/1975 | Kumata et al. | 423/236 |
| 3,950,492 | 4/1976 | Haese | 423/220 |
| 3,956,460 | 5/1976 | Brocoff | 423/236 |
| 4,001,374 | 1/1977 | Haese | 423/236 |
| 4,013,779 | 3/1977 | Haese | 423/237 |

FOREIGN PATENT DOCUMENTS

768,549   6/1967   Canada ................................ 423/238

OTHER PUBLICATIONS

Kohl et al., Gas Purification, pp. 312, 319–323.

Primary Examiner—O. R. Vertiz
Assistant Examiner—Eugene T. Wheelock
Attorney, Agent, or Firm—Thomas H. Murray

[57] ABSTRACT

A process is provided for removing ammonia, hydrogen sulfide and hydrocyanic acid from gases such as coke oven gas. In carrying out the process, the gas to be cleaned is first washed with an alkaline solution to remove the hydrogen sulfide and hydrocyanic acid. The hydrogen sulfide is oxidized by air to produce elemental sulfur, which is removed, and the alkaline solution is recirculated for reuse, a portion of the solution carrying cyanide and other compounds being diverted for further treatment. The gas to be cleaned is subjected to a second washing operation with an inorganic acid solution which removes the ammonia from the gas by formation of an ammonia salt solution. The salt solution is regenerated to recover the acid which is recirculated for reuse. The ammonia-containing solution, which may be the ammonia salt solution itself or a portion of the regenerated acid solution if it contains ammonia, is mixed with the diverted portion of the alkaline solution from the first washing step and the mixture thus formed is burned with a fuel gas and with air discharged from the oxidizing step at a temperature high enough to decompose the compounds in the mixture to nitrogen, carbon dioxide and water vapor which can be exhausted to the atmosphere.

3 Claims, 1 Drawing Figure

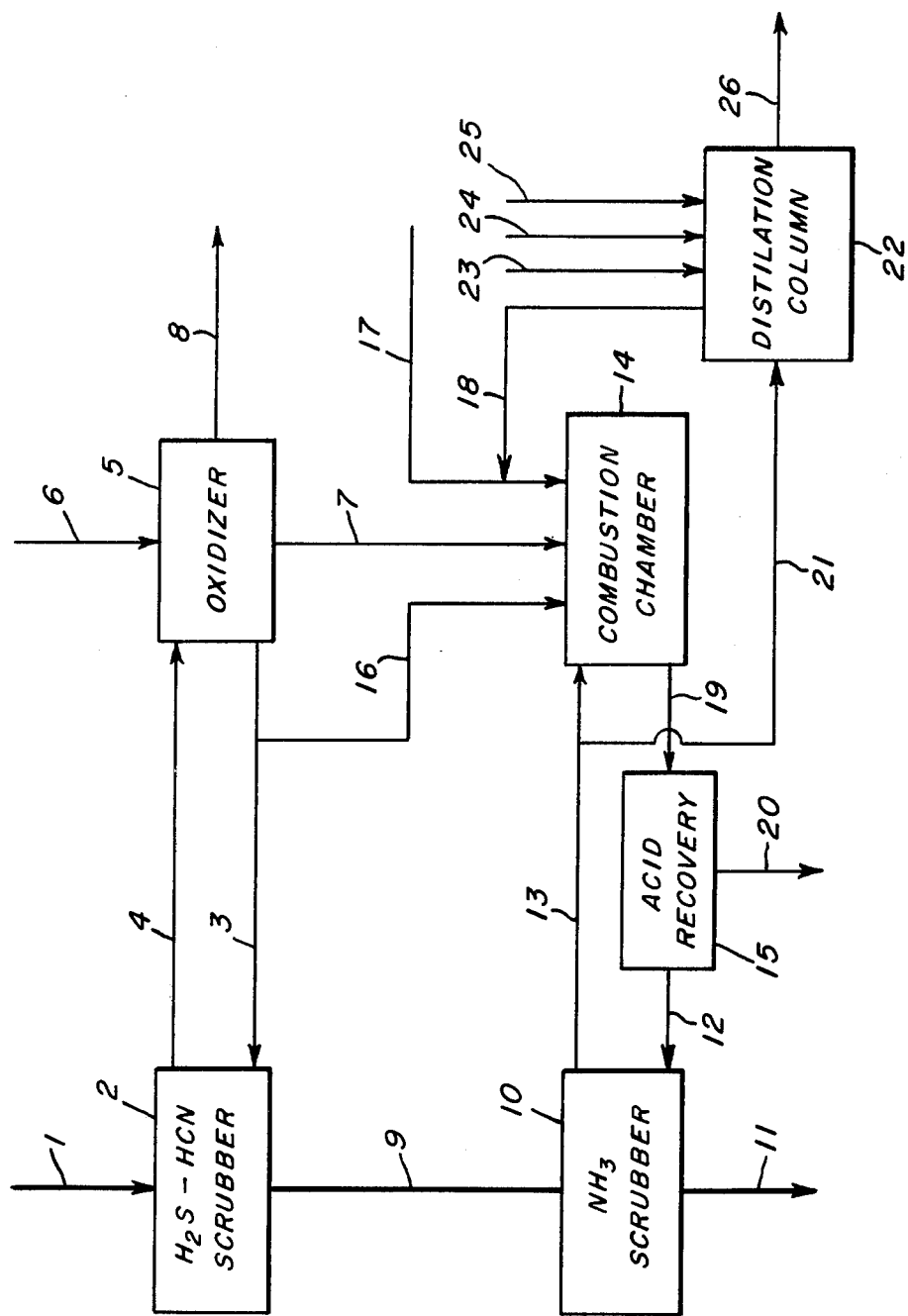

PROCESS FOR REMOVING AMMONIA, HYDROGEN SULFIDE AND HYDROCYANIC ACID FROM GASES

This is a continuation, of application Ser. No. 500,712, filed Aug. 26, 1974, now abandoned.

BACKGROUND OF THE INVENTION

The present invention relates to a process for cleaning gases, particularly coke oven gas, by removal of ammonia, hydrogen sulfide and hydrocyanic acid.

Various processes have been proposed for removing one or more of these substances from gases. In particular, oxidation processes are frequently used to remove hydrogen sulfide. This may be done by utilizing an alkaline fluid to absorb the hydrogen sulfide which is then oxidized by gasification of the solution with air, resulting in the formation of elemental sulfur which can be readily removed.

This process is successful in removing the hydrogen sulfide, and also hydrocyanic acid, from the gas but it has certain disadvantages. The alkaline fluids used are usually aqueous solutions of sodium or potassium salts or of ammonia, and other substances or additives are usually utilized to improve the transfer of the sulfur compounds or as activators. Thus, alkaline ammonia suspensions of metal hydroxides and various iron cyanide complexes are utilized. In some cases, arsenic compounds or anthraquinone disulfonic acids have also been used for increasing the transfer of the sulfur compounds. Furthermore, hydrocyanic acid which is usually present in coke oven gas is readily absorbed by the alkaline solution, which removes it from the gas by forming thiocyanates and possibly other complex compounds including related sulfur compounds. These undesirable products accumulate in the solution, in addition to the additives that have been intentionally added, and must be removed by diverting part of the flow of the solution at an appropriate point in the cycle for further treatment.

The solution thus diverted carries hydrocyanic acid and cyanide compounds, thiocyanates and other undesirable sulfur compounds such as thiosulfates and thionates. Processing this fluid has been the most difficult problem in the use of these known processes because the effluents and waste products which result must be disposed of in a non-polluting manner which satisfies the requirements that have been imposed for protection of the environment. Certain additives in the fluid can be recovered in some cases. Thus, if arsenic compounds are present, the fluid can be treated with sulfuric acid and the thiosulfates dissociate and precipitate arsenic sulfides to substantially completely remove the arsenic. Other undesirable compounds such as the cyanide compounds and sulfur compounds still remain in the fluid, however, and must be disposed of. Another environmental problem in the oxidation processes just described, particularly when the alkaline solution is an ammonia solution, is the absorption of ammonia by the air used for oxidizing the hydrogen sulfide. This air picks up large amounts of ammonia, and in some cases up to 50% of the ammonia content of the gas being cleaned is carried by the air discharged from the oxidizer. This may represent ammonia contents as high as 60 g/$Nm^3$ and because of this high ammonia content the air has to be further treated before it can be discharged to the atmosphere.

Ammonia in the coke oven gas must be completely removed in the process of cleaning the gas and the disadvantages of the oxidation process just described may be avoided by combining it with the ammonia removal processes disclosed and claimed in my prior patent applications Ser. No. 367,532, filed June 6, 1973, and Ser. No. 485,232, filed July 2, 1974, both assigned to the Assignee of the present invention. These applications disclose a process for removing ammonia from gases by washing the gas with an inorganic acid solution, such as sulfuric acid or hydrochloric acid, which forms an ammonia salt solution and thus removes the ammonia. The salt solution is then mixed with a fuel gas to form a combustible mixture which is burned at a high enough temperature to decompose the ammonia to form nitrogen and water vapor which can be discharged to the atmosphere. The combustion process also results in recovering the acid anhydride which is recycled for reuse in the washing cycle. In the second above-mentioned patent application, acidic ammonium bisulfite is used as the inorganic acid which adsorbs the ammonia from the gas to be cleaned by forming an ammonium sulfite salt solution. This salt solution is regenerated to the ammonium bisulfite by treatment with sulfur dioxide, and a portion of the regenerated acid thus obtained is withdrawn and burned in the manner described above to provide the required sulfur dioxide.

SUMMARY OF THE INVENTION

Processes are thus known for the removal of ammonia from coke oven gas and also for the removal of acidic components such as hydrogen sulfide and hydrocyanic acid. The known oxidation processes for the latter purpose, however, are subject to the disadvantages previously discussed as they result in waste materials which are difficult to dispose of without undesirable or impermissible environmental pollution. In accordance with the present invention, the oxidation process for removing the acidic constituents is combined with the process of the copending applications mentioned above for removing the ammonia, and the materials from both processes which are to be disposed of are burned together in a manner to completely dispose of the waste materials with no environmental pollution.

More specifically, hydrogen sulfide and hydrocyanic acid are first removed from gases such as coke oven gas by washing the gas with an alkaline solution to adsorb these acidic constituents. The solution is then treated with atmospheric air to oxidize the hydrogen sulfide, resulting in the formation of free elemental sulfur which is removed from the solution. the air used for this purpose contains ammonia picked up from the solution and must be further treated after discharge from the oxidizer, while the solution itself still contains the cyanide compounds as well as other sulfur compounds and possibly additives as discussed previously. In order to remove these substance a part of the solution is diverted for treatment and the remaining part is returned to the washing cycle for reuse.

The gas to be cleaned is subjected to a second washing step using an inorganic acid solution which removes the ammonia from the gas by forming an ammonia salt solution. This salt solution and the diverted portion of the solution from the first washing step are mixed with each other and with a fuel gas to form a combustible mixture which is burned at a high enough temperature to decompose the unwanted compounds to nitrogen, carbon dioxide and water vapor which can be exhausted harmlessly to the atmosphere. The ammonia-carrying air discharged from the oxidizer after being used for oxidizing the hydrogen sulfide is used to provide the necessary combustion air, and the ammonia carried by this air is thus also decomposed and disposed of. Any sulfur compounds in the solutions are oxidized to form sulfur dioxide which is separately removed. The acid anhydride recovered from the burning step is returned to the second washing cycle for reuse. If the process of the second above-mentioned application is utilized, a portion of the recovered ammonia-containing acid solution is burned to produce sulfur dioxide for treating the salt solution.

In the treatment of coke oven gases, condensates containing ammonia salts always occur and in accordance with a further feature of the invention, any excess sulfur dioxide is disposed of by diverting a part of the solution which carries it and mixing this with the condensate. The condensate is then distilled in the usual manner, with the addition of lime or caustic soda, and the ammonia releasd from the condensate in this manner is fed to the combustion chamber in which the burning discussed above takes place and is thus decomposed and disposed of, while the sulfur is removed in the form of solid non-polluting compounds.

BRIEF DESCRIPTION OF THE DRAWING

The invention will be more fully understood from the following detailed description, taken in connection with the accompanying drawing, the single FIGURE of which is a schematic diagram illustrating one embodiment of the process according to the present invention.

DESCRIPTION OF PREFERRED EMBODIMENT

Referring to the drawing, the gas to be cleaned, such as coke oven gas, is carried by a pipe 1 to a scrubber 2. The scrubber 2 may be any known or suitable type of device in which the gas is washed by intimate contact with a washing solution. An alkaline washing solution is used which is introduced to the scrubber 2 through a pipe 3 to absorb hydrogen sulfide, hydrocyanic acid and any other acidic constituents that may be present, and which is discharged from the scrubber through the pipe 4. The solution passes from the pipe 4 to an oxidizer 5 of any suitable type in which it is treated, or gasified, with atmospheric air supplied through the pipe 6. This oxidizes the hydrogen sulfide and forms free or elemental sulfur which may be removed as a foam through the pipe 8 for further processing and recovery.

The air used for oxidizing the hydrogen sulfide is discharged from the oxidizer 5 through a pipe 7. Since this air contains a relataively large amount of ammonia which it absorbs from the alkaline washing solution, as discussed above, it cannot be directly discharged and is utilized for combustion air in a later step of the process as described below. The alkaline washing solution is discharged from the oxidizer through the pipe 3 and returned to the scrubber 2 for reuse. The solution thus discharged from the oxidizer is free of hydrogen sulfide, but cyanide compounds and other sulfur compounds, as well as certain additives that may have been used, are still present. In order to dispose of these unwanted materials, a portion of the solution is diverted from the pipe 3 through the pipe 16 to be burned as described below. Any necessary make-up solution may of course be added at any desired point in the cycle.

The washing solution utilized in the scrubber 2 may be any suitable alkaline solution and may consist of sodium or potassium salts with or without additives as discussed above. It is preferred, however, to use an alkaline ammonia solution, and it has been found by experiment that washing solutions which contain metal compounds such as iron hydroxide can be burned to decomposition at lower temperatures than those which do not contain metal compounds. A definite catalytic action occurs which has been confirmed by burning tests of corresponding metal dusts. A preferred solution for use in the present process is, therefore, an alkaline ammonia-iron hydroxide suspension which can be burned at temperatures as low as 920° C with complete decomposition of the ammonia, while similar solutions without metal compounds must be burned at temperatures not less than 1000° C to obtain similar results. It is to be understood, of course, that the invention is not limited to these specific temperatures or compositions so long as decomposition of the ammonia is obtained, and it has been found that good results can be obtained at temperatures in the range from 900° to 1000° C and preferably between 950° and 1050° C.

After leaving the scrubber 2, the gas to be cleaned passes through a pipe 9 to a second scrubber 10 for removal of ammonia, the clean gas being discharged through a pipe 11. The scrubber 10 may be of any suitable or desired type and, as described in the two above-mentioned patent applications, the ammonia is removed from the gas by washing with an inorganic acid solution which is introduced to the scrubber 10 through a pipe 12. The ammonia in the gas is absorbed by the acid solution and forms an ammonia salt solution which is discharged from the scrubber through a pipe 13. In accordance with one aspect of the prior applications, the ammonia salt solution is directed by the pipe 13 to a combustion chamber 14. The portion of the washing solution of the first washing step diverted through the pipe 16 is also fed to the combustion chamber 14 and these two solutions are mixed with each other and with a fuel gas provided through the pipe 17 which may be a part of the coke oven gas being treated or any other suitable gaseous fuel. The fuel is mixed with the solutions from the pipes 13 and 16 to form a combustible mixture and this mixture is burned in the combustion chamber 14. As previously discussed, the air used in the oxidizer 5 for oxidizing the hydrogen sulfide picks up a relatively large amount of ammonia from the first washing solution. This air contains about 15 to 16% oxygen and is about equal to the amount required for combustion of the mixture of washing solutions. The air discharged from the oxidizer is, therefore, directed through the pipe 7 to the combustion chamber 14 and the ammonia carried by this air is thus disposed of.

As previously discussed, the mixture in the combustion chamber 14 is burned at a temperature such that the ammonia and cyanide compounds in the solutions fed into the chamber are decomposed to nitrogen, carbon dioxide and water vapor which can be discharged harmlessly to the atomosphere. The remaining products of combustion comprise the acid anhydride recovered from the ammonia salt solution, and a quantity of sulfur dioxide formed from the remaining sulfur compounds in the solutions fed into the combustion chamber. The products of the combustion process pass through a pipe 19 to a suitable recovery apparatus 15 which may be of the type disclosed in the first-mentioned prior application and which preferably includes a scrubber for separating the sulfur dioxide. The recovered acid is returned through the pipe 12 to the scrubber 10 for reuse while the combustion gases from which the sulfur dioxide has been removed, and which consist only of nitrogen, carbon dioxide and water vapor are discharged to the atmosphere through the pipe 20.

If the ammonia removal process of the second abovementioned application is utilized, the process differs somewhat in that the inorganic acid is acidic ammonium bisulfite and the resulting ammonium sulfite solution is treated with sulfur dioxide to regenerate the acid ammonium bisulfite for reuse in the scrubber 10. A portion of this recovered acid solution is burned in the combustion chamber 14 with the washing solution from the pipe 16 as previously described and, in addition to the products described above, enough sulfur dioxide is produced for the treatment of the ammonia sulfite. In other respects, the process is the same as that just described.

In the removal of ammonia from the gas by the processes of the two prior applications, the sulfur compounds in the washing solutions are, in effect, carriers for the ammonia from the gas where it is absorbed to the burning step where it is decomposed. The sulfur itself is not lost and, except for negligibly small losses, the apparatus needs to be charged only once with a suitable sulfur-containing inorganic acid such as sulfuric acid or ammonium bisulfite. The portion of the first washing solution diverted through the pipe 16 contains sulfur compounds, as previously discussed, which are introduced into the combustion chamber 14 and converted to sulfur dioxide.

Thus, the excess sulfur, which as been removed from the gas, appears as sulfur dioxide in the combustion chamber. In some cases, the sulfur dioxide can be discharged with the combustion gases if the amount of sulfur dioxide is small enough compared to the volume of combustion gases that the permissible concentration is not exceeded. In many cases, however, this is not possible. In such cases, the sulfur dioxide may be disposed of in the following manner. In the treatment of hot coke oven gases, substantial amounts of gas condensates accumulate due to initial cooling of the gas. These condensates contain considerable quantities of fixed ammonia salts. This material is usually disposed of by distillation with the addition of lime or caustic soda. Thus, the gas condensates may be supplied through a pipe 23 to a distillation column 23, lime or other alkali solution being supplied through a pipe 24 and steam through a pipe 25.

The sulfur dioxide which has been separated from the combustion gases as previously described is carried by the recovered acid through the pipe 12 and through the scrubber 10 to the discharge pipe 13. Before entering the combustion chamber 14, a portion of the sulfur-carrying ammonia salt solution is diverted through the pipe 21. The amount of the solution diverted is made just equivalent to the amount of sulfur dioxide to be disposed of so as to maintain the sulfur balance in the system. The ammonia salt solution diverted to the pipe 21 is introduced to the gas condensate in the distillation column 22, the amount of ammonia thus added not being sufficient to significantly increase the amount of ammonia salts in the condensate. The condensate is distilled in the column 22 in the usual manner and produces ammonia which is discharged through a pipe 18 to the combustion chamber 14 where it is decomposed by the heat and discharged with the other combustion gases. The ammonia may be introduced into the combustion chamber by mixing with the fuel gas in the pipe 17, as indicated in the drawing, or in any other desired manner. The sulfur dioxide in the solution delivered through the pipe 21 combines with the lime and other materials in the column 22 to form solid, non-polluting compounds, such as calcium sulfate, which are withdrawn through the pipe 26 for suitable disposition.

A process is thus provided for the removal of ammonia, hydrogen sulfide, hydrocyanic acid and other acidic components from gases such as coke oven gas. The process results in the decomposition of the removed substances to nitrogen, carbon dioxide and water vapor, which can safely be discharged into the atmosphere, and to solid residual materials such as elemental sulfur and sulfur compounds which can easily be disposed of in a non-polluting manner.

I claim as my invention:

1. A process for removing ammonia, hydrogen sulfide and hydrocyanic acid from gases in which ammonia-containing condensates are also initially present, said process comprising subjecting the gas to be cleaned to a first washing step with an alkaline solution adapted to absorb hydrogen sulfide and hydrocyanic acid, said solution being selected from the group consisting of sodium and potassium salts and alkaline ammonia solutions, treating said solution with air following said first washing step to oxidize the hydrogen sulfide absorbed by the solution to form elemental sulfur and removing said sulfur, said air and ammonia absorbed thereby being continuously discharged from said oxidation step, diverting a portion of said treated solution following the oxidation step and recycling the remaining solution for reuse in said first washing step, the treated solution containing cyanide and sulfur compounds, subjecting the gas to be cleaned to a second washing step with an inorganic acid solution selected from the group consisting of sulfuric acid, hydrochloric acid and ammonium bisulfite to remove ammonia from the gas by formation of an ammonia salt solution, mixing at least a part of said ammonia salt solution with said diverted portion of the solution from the first washing step, supplying to said mixture the air and absorbed ammonia discharged from the oxidation step, burning said mixture with a fuel gas and said air at a temperature to decompose the ammonia and the cyanide containing constituents of the mixture to nitrogen, carbon dioxide and water vapor, and to convert said sulfur compounds to sulfur dioxide, recovering from the products of combustion any other components present therein including sulfur dioxide and said inorganic acid, separating said sulfur dioxide, recirculating said recovered acid for reuse in said second washing step, adding sulfur dioxide recovered from said products of combustion to the inorganic acid recovered from the products of combustion to be carried by said inorganic acid through the second washing step, diverting a portion of the resulting salt solution carrying a predetermined amount of sulfur dioxide, adding said diverted salt solution to said condensates with an alkali solution, distilling the mixture thus formed to separate ammonia therefrom, and burning said distilled ammonia with said mixture of solutions from the first and second washing steps to decompose the ammonia.

2. The process of claim 1 in which the temperature of burning said mixture of washing solutions is in the range between 900° and 1100° C.

3. The process of claim 1 in which said alkaline washing solution is an ammonia solution containing iron hydroxide compound and the temperature of burning said mixture of solutions is in the range between 950° and 1050° C.

* * * * *